Nov. 29, 1927.

A. J. LEWIS 1,650,841

METAL CUTTING OR WORKING DEVICE

Filed March 31, 1926

INVENTOR
Arthur J. Lewis
BY Wooster & Davis
ATTORNEYS

Patented Nov. 29, 1927.

1,650,841

UNITED STATES PATENT OFFICE.

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT.

METAL CUTTING OR WORKING DEVICE.

Application filed March 31, 1926. Serial No. 98,898.

This invention relates to metal forming machines of the type illustrated in my prior Patents #992,890, dated May 23, 1911, and #1,417,397, dated May 23, 1922, and especially to the means for reciprocating a tool slide such as the cutoff slide. In this type of machine it is very desirable that the cutoff slide, for instance, should have a positive motion both to cut off the wire and to recede or retract it, and it is also desirable that the cutoff device be adjustable in a line with the wire.

It is, therefore, an object of my invention to provide an operating means for the cutoff slide, or any other slide in which substantially the same movements are required, which will allow adjustment of the slide in a direction longitudinally of the wire line without disturbing the cam used for operating the slide.

Figure 1:
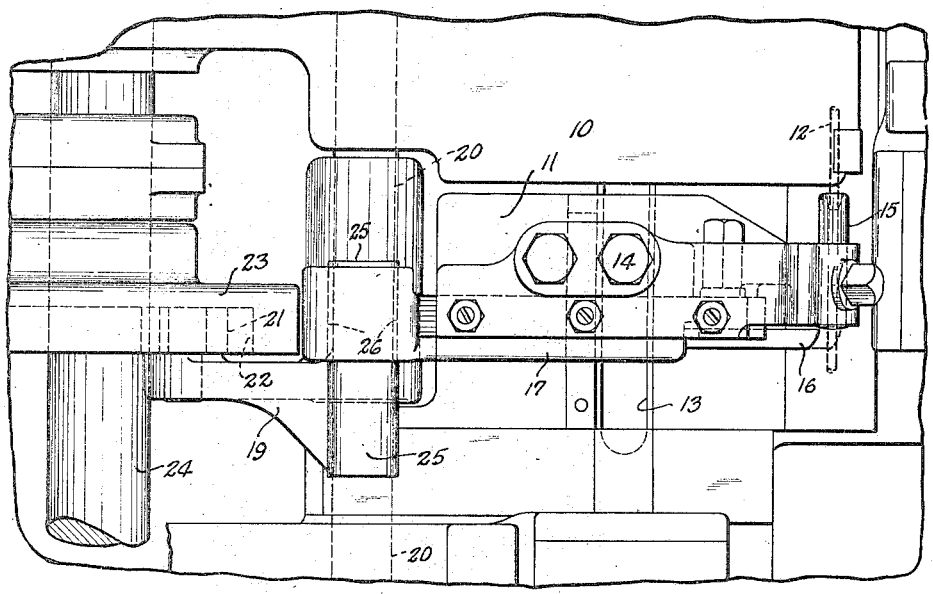
Figure 2:
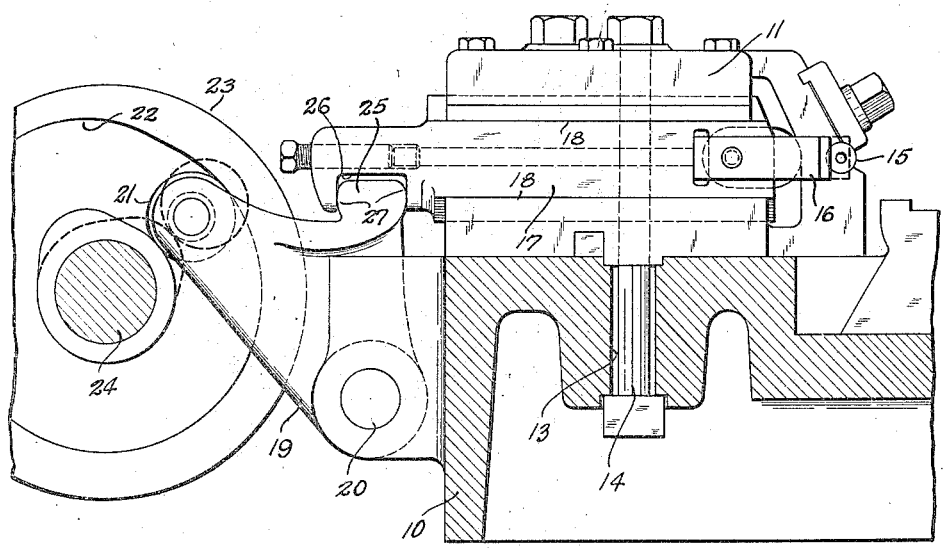

With the foregoing and other objects in view, I have devised the construction illustrated in the accompanying drawing forming a part of this specification, similar reference characters being employed throughout the various figures to indicate corresponding elements. In this drawing, Fig. 1 is a top plan view of a portion of a wire forming machine showing a cutoff slide, its mounting and my improved operating means for the slide, and Fig. 2 is a vertical section of a portion of the machine showing the slide, its mounting and my improved operating mechanism for the slide in elevation.

A portion of the bed of the machine is shown at 10 on which the various slides are mounted, but in the present instance, I have shown only the cutoff slide, its mounting and my improved operating means therefor, it being, of course, understood that this improved operating means is not limited for use on a cutoff device, but may be used for other devices in which a similar movement and adjustment is required. As is usual in this type of devices the block or support 11 is mounted on the bed for adjustment longitudinally of the wire line, a portion of the wire being indicated in dotted lines at 12, there being a slot 13 in the bed through which a clamping bolt 14 extends which is used to clamp the block or support in adjusted position. This adjustment of the cutoff device is, of course, used to adjust the length of the wire cut off at each cutting operation. The block carries a tubular guide 15 for the wire which also acts as one member of the cutting device. The other member of this device is a knife or similar element 16 which is reciprocated across the end of the tube 15 at the proper time to cut the wire. This cutter is mounted on a slide 17 mounted in suitable guides 18 in the support 11, and this mounting is arranged to allow reciprocating movements of the slide and the cutter transversely of the wire line. Ordinarily this slide is advanced at the proper time by means of a cam to cut the wire, and it is desirable that the cam act to positively shift the slide in both the advancing movement and the retracting movement. Heretofore, so far as I am aware, in order to secure this action and to allow for the adjustment of the cutting device longitudinally of the wire line it has been necessary to shift the cam, but this is objectionable as requiring considerable time for the adjusting operation and also because of more or less difficulty in properly securing the cam in position after adjustment. I have, therefore, provided an improved connection between the cam and the slide 17 for advancing and retracting the slide which will permit adjustment of the slide longitudinally of the wire line without in any way disturbing the cam.

For this purpose I have provided a bell crank lever 19 pivoted to the bed at 20 so as to swing in a plane transverse to the wire line. One arm of this bell crank carries a roller 21 running in a cam groove 22 in the side of the cam 23 mounted on the shaft 24 driven by any suitable means in certain timed relation with the other devices of the machine. The bell crank is also provided with a transversely extending guide or bar portion 25 extending transversely of the plane in which the bell crank rocks, or, that is, it extends in a direction longitudinally of the wire line. In the present showing this bar is located above the pivot 20 and extends into an open bottomed notch or groove 26 in the slide 17 so that the walls on the opposite sides of this groove engage the opposite sides of the bar and form a positive driving connection between the slides and the bell crank. The opposite side edges 27 of this bar are curved, as shown in Fig. 2, to allow for the relative turning movements between the bell crank and the slide as the bell crank and the slide are operated by the cam. It is to be noted that, as the notch or groove 26 extends transversely of the slide, adjustments of the cutoff slide and its mounting longitudinally of the wire line will merely move the walls on the opposite sides of the notch or groove 26 along the bar 25 without in any way disturbing the bell crank or the cam for operating the same, and that as soon as the cutoff device is secured in its adjusted position it has the same positive connection with the bell crank and the cam that it had before the adjustment was made. Thus it will be apparent that in adjusting the cutoff device for cutting off different lengths of wire but one adjustment only is necessary, and that is the adjustment of the position of the cutoff device, there being no adjustment of the cam or the bell crank lever required. The bar 25, of course, will be of a sufficient length to accommodate the extremes of adjustment of the cutoff device.

Having thus set forth the nature of my invention, what I claim is:

1. In a device of the character described, a slide mounted for reciprocating movements and also mounted for adjustment in a direction transversely of the reciprocating movement, a pivoted lever, a connection from the lever to the slide for operating the slide in both directions arranged to allow said lateral adjustment of the slide without shifting the lever, and means for rocking the lever to reciprocate the slide comprising a rotatable member having a cam groove and means on the lever running in said groove and operated by both sides of the groove.

2. In a device of the character described, a slide mounted for reciprocating movements and also mounted for adjustment in a direction transversely of the reciprocating movement, a pivoted lever, a connection from the lever to the slide for positively shifting the slide in opposite directions to reciprocate the same and arranged to permit free relative movement between the slide and the lever in a direction transversely of said reciprocating movement to allow adjustment of the slide, and means for rocking the lever to reciprocate the slide.

3. In a device of the character described, a reciprocatory slide, means for mounting the slide so that it may be adjusted in a direction transversely of the reciprocatory movement, a pivoted lever having an arm provided with a guide portion extending transversely of the slide, a fork on the slide arranged to engage said guide portion and slidable longitudinally thereof, and means for rocking the lever to reciprocate the slide.

4. In a device of the character described, a reciprocatory slide, means for mounting the slide so that it may be adjusted in a direction transversely of the reciprocatory movement, a pivoted lever having a guide or bar portion extending transversely of the slide, said guide or bar portion being rounded on the opposite sides thereof in a direction transversely of said portion, a fork on the slide arranged to engage said rounded sides and provide a driving connection between the lever and the slide, and means for rocking the lever to reciprocate the slide.

5. In a device of the character described, a slide mounted for reciprocating movements, means for mounting the slide so that it may be adjusted in a direction transversely of said movement, a cam comprising a rotary member having a cam groove in a side wall thereof, means running in the groove and operated by both sides of the groove, and a connection from the said latter means to the slide to positively operate the slide in both directions arranged to allow lateral adjustment of the slide without shifting the cam.

6. In a wire forming machine, a support, a wire guide mounted on the support, a cutoff slide mounted on the support for movement transversely of the wire line, means for mounting the support to allow adjustment longitudinally of the wire line, a cam comprising a member mounted to rotate about an axis parallel with the wire line and having a cam groove in a side wall thereof, means running in the groove operating positively in both directions, and a connection from the cam to the slide for shifting the slide in a direction transversely of the wire line and arranged to allow adjustment of the slide longitudinally of the wire line without shifting the cam.

7. In a wire forming machine, a support, a wire guide mounted on the support, a cutoff slide mounted on the support for movement transversely of the wire line, means for mounting the support to allow adjustment longitudinally of the wire line, a cam, a bell crank lever mounted to rock in a plane transversely of the wire line and connected to the cam for positive operation in both directions, said bell crank being provided with a transversely extending bar, and a connection from said bar to the slide and movable longitudinally along said bar.

8. In a wire forming machine, a support, a wire guide mounted on the support, a cutoff slide mounted on the support for movement transversely of the wire line, means for mounting the support to allow adjustment longitudinally of the wire line, a cam, a bell crank lever mounted to rock in a plane transversely of the wire line and connected to the cam for positive operation in both directions, said bell crank being provided with a bar above its pivot and extending longitudinally of the wire line, and said slide being provided with an open bottomed transverse recess to receive said bar to form a driving connection from the bell crank to the slide.

9. In a device of the character described, a reciprocatory slide member, means for mounting the slide member so that it may be adjusted in a direction transversely of the reciprocatory movement, a pivoted lever having an arm member, one of said members being provided with a guide portion extending transversely of the slide, a fork on the other member arranged to engage said guide portion and slidable longitudinally thereof, and means for rocking the lever to reciprocate the slide.

10. In a device of the character described, a reciprocatory slide member, means for mounting the slide member so that it may be adjusted in a direction transversely of the reciprocatory movement, a pivoted lever member, one of said members having a guide or bar portion extending transversely of the slide, said guide or bar portion being rounded on the opposite sides thereof in a direction transversely of said portion, a fork on the other member arranged to engage said rounded sides and providing driving connection between the lever and the slide, and means for rocking the lever to reciprocate the slide.

11. In a wire forming machine, a support, a wire guide mounted on the support, a cut-off slide member mounted on the support for movement transversely of the wire line, means for mounting the support to allow adjustment longitudinally of the wire line, a cam, a bell crank lever mounted to rock in a plane transversely of the wire line and connected to the cam for positive operation in both directions, one of said members being provided with a transversely extending bar, and a connection from said bar to the other member and movable longitudinally along said bar.

In testimony whereof I affix my signature.

ARTHUR J. LEWIS.